(12) United States Patent
McGlothlin et al.

(10) Patent No.: US 7,126,121 B1
(45) Date of Patent: Oct. 24, 2006

(54) REAL-TIME VIDEO RADIATION EXPOSURE MONITORING SYSTEM

(75) Inventors: James D. McGlothlin, West Lafayette, IN (US); Wei-Hsung Wang, West Lafayette, IN (US); Ryan M. Traylor, Dale, IN (US)

(73) Assignee: Purdue Research Foundation, West Lafayette, IN (US)

( * ) Notice: Subject to any disclaimer, the term of this patent is extended or adjusted under 35 U.S.C. 154(b) by 122 days.

(21) Appl. No.: 10/600,864

(22) Filed: Jun. 20, 2003

Related U.S. Application Data

(60) Provisional application No. 60/390,983, filed on Jun. 22, 2002.

(51) Int. Cl.
*G01T 1/18* (2006.01)

(52) U.S. Cl. ............... 250/336.1; 350/370.07

(58) Field of Classification Search .......... 250/336.1, 250/370.07, 370.08, 390.03, 376, 378, 379, 250/253
See application file for complete search history.

(56) References Cited

U.S. PATENT DOCUMENTS

| | | | | |
|---|---|---|---|---|
| 3,663,821 | A * | 5/1972 | Finkle | 250/214 VT |
| 4,827,414 | A * | 5/1989 | Christianson et al. | 250/390.01 |
| 5,157,703 | A * | 10/1992 | Wolf | 378/98.2 |
| 5,173,609 | A * | 12/1992 | Lacoste et al. | 250/370.07 |
| 5,256,878 | A * | 10/1993 | LeVert | 250/370.04 |
| 5,324,948 | A * | 6/1994 | Dudar et al. | 250/379 |
| 5,572,027 | A * | 11/1996 | Tawil et al. | 250/336.1 |
| 5,841,142 | A * | 11/1998 | Duftschmid et al. | 250/395 |
| 6,282,410 | B1 * | 8/2001 | Monsen et al. | 455/90.3 |
| 6,388,259 | B1 * | 5/2002 | Murdock | 250/370.01 |
| 6,492,957 | B1 * | 12/2002 | Carillo et al. | 343/841 |
| 6,633,327 | B1 * | 10/2003 | Williams et al. | 348/82 |
| 2002/0032689 | A1 * | 3/2002 | Abbott et al. | 707/104.1 |
| 2002/0180606 | A1 * | 12/2002 | Kitaguchi et al. | 340/573.1 |
| 2004/0056196 | A1 * | 3/2004 | Yoshida et al. | 250/336.1 |
| 2005/0109939 | A1 * | 5/2005 | Engler et al. | 250/336.1 |

OTHER PUBLICATIONS

Rosen et al., "Concurrent Video Filming and Measuring for Visualization of Exposure," *American Insdustrial Hygiene Association Journal*, vol. 48, Aug. 1987, pp. 688-692.

McGlothlin, et al., "Dust Control by Ergonomic Design," *Proceedings IXth International Conference on Production Research*, Cincinnati, OH, Aug. 17-20, 1987, pp. 687-694.

Kovein et al., "Real-Time Personal Monitoring in the Workplace Using Radio Telemetry," *Applied Occupational and Environmental Hygiene*, vol. 7, No. 3, Mar. 1992, pp. 168-173.

Gressel et al., "Video Exposure Monitoring—A Means of Studying Sources of Occupational Air Contaminant Exposure, Part 1—Video Exposure Monitoring Techniques," *Applied Occupatioinal and Environmental Hygiene*, vol. 8, No. 4, Apr. 1993, pp. 334-338.

(Continued)

*Primary Examiner*—David Porta
*Assistant Examiner*—Faye Booslis
(74) *Attorney, Agent, or Firm*—William F. Bahret

(57) ABSTRACT

A real-time video radiation exposure monitoring system comprising a Geiger-Müeller meter and a video camera linked to a computer programmed to display video images from the camera simultaneously with data from the Geiger-Müeller meter. A radio modem provides wireless data communications between the Geiger-Müeller and the computer. One aspect of the invention is a retrofit of a conventional Geiger-Müeller meter to include a microcontroller with internal A/D converter enabling the meter to output instantaneous measurements in RS-232 serial format.

4 Claims, 3 Drawing Sheets

OTHER PUBLICATIONS

Heitbrink et al., "Video Exposure Monitoring—A Means of Studying Sources of Occupational Air Contaminant Exposure, Part 2—Data Interpretation," *Applied Occupational and Environmental Hygiene.*, vol. 8, No. 4, Apr. 1993, pp. 339-343.

Walsh et al., "Computer-Aided Video Exposure Monitoring," *Applied Occupational and Environmental Hygiene*, vol. 15, No. 1, 2000, pp. 48-56.

Voskicky, "The Development, Assembly, and Pilot Testing of a Task-Based Video Exposure Assessment System," Master of Science Thesis, Purdue University, West Lafayette, Indiana, Aug. 2000, pp. 19-30.

Protopapas, "Videography With Comparative Analyses of Real-Time Monitoring Versus Diffusive Monitoring to Control Methylene Chloride in an Industrial Setting," Master of Science Thesis, Purdue University, West Lafayette, Indiana, Aug. 2000, pp. 11-28.

Roggenbauer et al., "Development and Use of a Radio-Telemetry Video Exposure Monitoring System to Identify and Control Airborne Particulate Exposures," American Industrial Hygiene Conference and Exposition, New Orleans, Louisiana, Jun. 6, 2001 (poster) (1 page).

Roggenbauer et al., "Development and Use of a Radio-Telemetry Video Exposure Monitoring System to Identify and Control Airborne Particulate Exposures at a Chemical Manufacturing Facility," slide presentation to Eli Lilly Tippecanoe facility employees, Jun. 12, 2001 (11 pages).

Roggenbauer, "Development and Use of a Radio-Telemetry Video Exposure Monitoring System to Identify and Control Airborne Particulate Exposures in a Pharmaceutical Manufacturing Facility," Master of Science Thesis, Purdue University, West Lafayette, Indiana, Aug. 2001, pp. 1-6.

\* cited by examiner

REAL-TIME VIDEO RADIATION EXPOSURE MONITORING SYSTEM

CROSS-REFERENCE TO RELATED APPLICATION

This application claims the benefit of the filing date of Provisional Application No. 60/390,983, filed Jun. 22, 2002, which application is hereby incorporated by reference.

GOVERNMENT RIGHTS

This invention was made with government support under Contract/Grant No. T42/CCT510420 awarded by the National Institute for Occupational Safety and Health. The government has certain rights in the invention.

BACKGROUND OF THE INVENTION

This invention relates to systems and methods for monitoring radiation exposure, and more particularly to real-time radiation exposure monitoring systems and methods.

The mission of health physicists in regard to radiation workers is to make their radiation exposure "as low as reasonably achievable", a Nuclear Regulatory Commission primary radiation protection philosophy known by the acronym "ALARA", without interfering with the workers' normal job performance. However, in order to accomplish this, the health physicist must first be able to recognize the radiation intensity. Regular survey for radioactive contaminants in a radiation facility using a survey meter is not only a judicious health physics practice, but is also required by Nuclear Regulatory Commission licenses and federal regulations. Failure to perform appropriate surveys can have serious repercussions.

A number of approaches and instruments have been developed and used throughout the years with the goal of locating radioactive sources and quantifying the corresponding radiation exposure. The most common type of radiation detector is a Geiger-Müeller (GM) survey meter, also called a Geiger counter. A conventional GM meter is a handheld meter with a radiation detection probe and an analog display without any means for recording radiation measurements. Thus, if a record is desired, an operator must manually record meter readings on paper or other media. Such readings, of course, do not indicate the position or orientation of the meter with respect to any radiation source, nor do they reveal any information concerning work activities near the radiation source that may have been a factor contributing to a given exposure level. Conventional GM meters and similar instruments are therefore not as useful as they might be to health physicists attempting to obtain an accurate assessment of workplace exposure during performance of (normal) job tasks, and yet such equipment is the mainstay for health physicists in the accomplishment of their mission.

In recent years, in other contexts, the use of real-time instrumentation has been combined with the use of video to perform exposure assessments, e.g., assessments of exposure to air contaminants as described, for example, by James D. McGlothlin et al. in "Dust Control by Ergonomic Design," *Proceedings IXth International Conference on Production Research,* 687–694 (1987), and by Michael G. Gressel et al. in "Video Exposure Monitoring—A Means of Studying Sources of Occupational Air Contaminant Exposure, Part I—Video Exposure Monitoring Techniques," *Applied Occupational and Environmental Hygiene* 8(4): 334–338 (1993). Despite such existing air monitoring methods, those in the radiation safety field have heretofore been forced to rely on relatively basic equipment and time-consuming techniques for assessing radiation exposure, and have thereby been hampered in their ability to develop effective strategies for reducing workplace exposure to radiation.

SUMMARY OF THE INVENTION

The present invention provides a real-time video radiation exposure monitoring system which facilitates fast and effective radiation exposure assessments. The system comprises a radiation detector and video camera linked to a computer programmed to display video images from the camera simultaneously with data from the radiation detector. In one embodiment, the system includes a radio modem for wireless data communications between the radiation detector and the computer.

As one aspect of the invention, a conventional Geiger-Müeller meter is modified by adding a circuit which makes it capable of outputting instantaneous measurements in RS-232 serial format.

This real-time video radiation exposure monitoring system allows a radiation safety professional to understand the exposure of an individual to radiation, and also allows for the determination of which elements during a job operation contributed to the individual's overall exposure. By understanding which specific task elements that lead to the greatest radiation exposure, a health physicist can train employees to utilize good health physics practices that will minimize the exposure.

These and other objects and advantages of the present invention will be more apparent upon reading the following detailed description in conjunction with the accompanying drawings.

DESCRIPTION OF PREFERRED EMBODIMENTS

Figure 1:
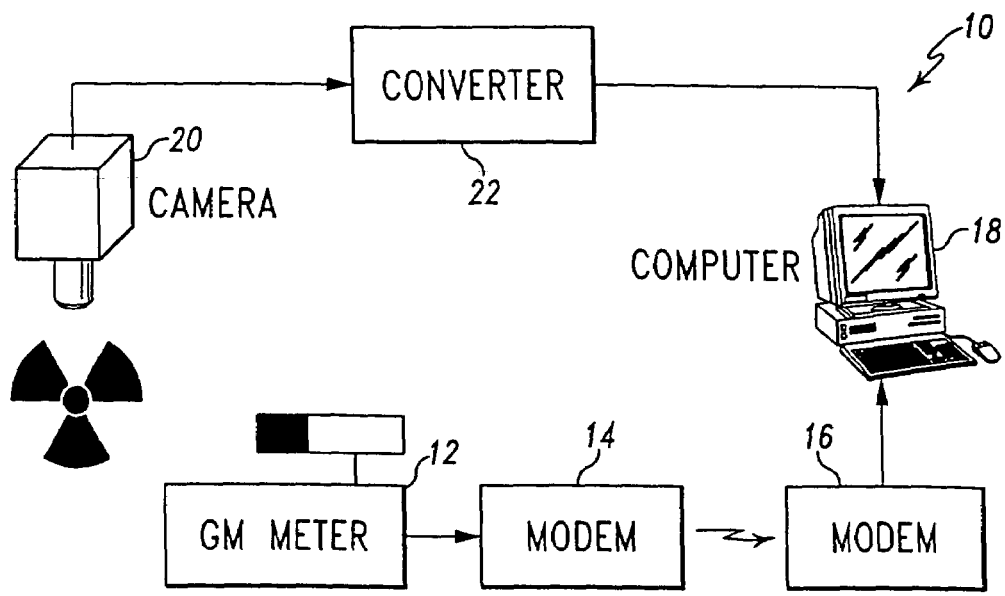
FIG. 1 is a block diagram of one embodiment of a real-time video radiation exposure monitoring system according to the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring to FIG. 1, one embodiment of a system 10 according to the present invention includes a radiation detector 12 which may be handheld by a radiation safety professional who uses it to locate radioactive contaminants during a survey of a laboratory or other facility. The radiation detector may be a conventional Geiger-Müeller (GM) meter modified for digital output as will be described. The GM meter is connected by a wireless link, such as through a modem 14 and modem 16, to a computer 18. An analog or digital video camera 20, which may also be handheld by the radiation safety professional, is connected to the computer through a video converter 22. Computer 18 may be a desktop or laptop computer. One example of a computer considered suitable for use in the disclosed embodiment is a Sony VAIO laptop with, for example, a Pentium III 1 GHz processor, 20 GB hard drive, 256 MB RAM, and Windows 2000 or XP operating system. A suitable video converter for analog videotape is the Dazzle Digital Video Creator, USB version, commercially available from SCM Microsystems.

Figure 2:
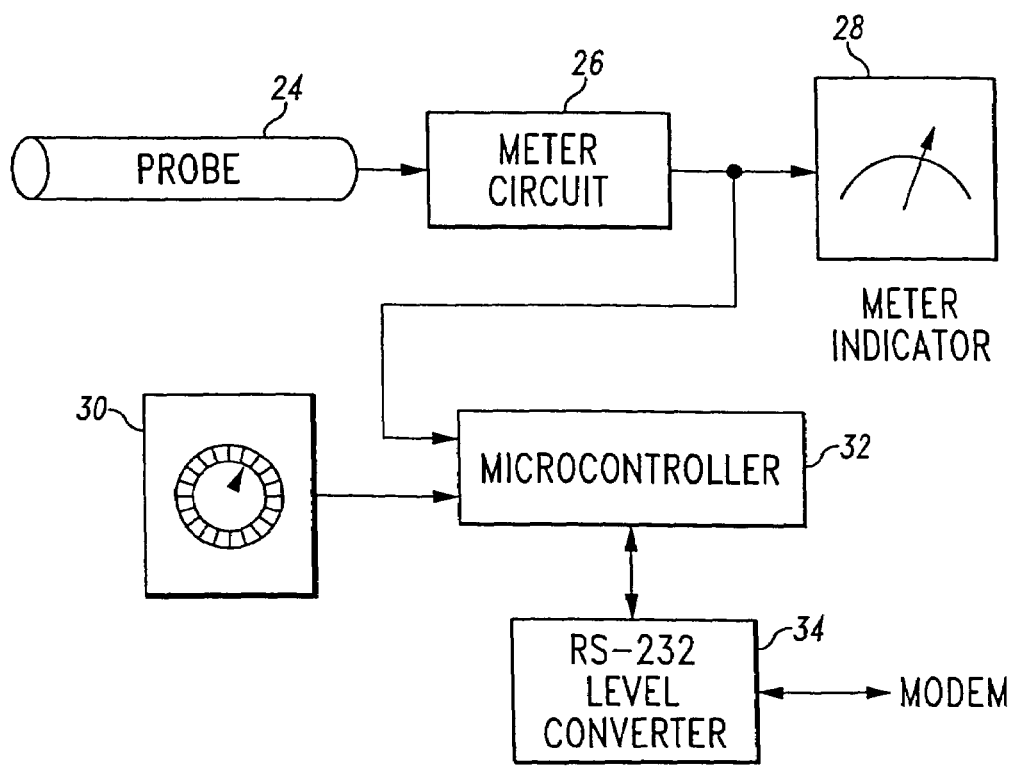
FIG. 2 is a block diagram of the Geiger-Müeller (GM) meter of FIG. 1.

As shown in FIG. 2, GM meter 12 includes the main components of a typical GM meter, including a detection probe 24 containing a Geiger-Mueller tube, an electronic meter circuit 26 and a display or meter indicator 28. The meter circuit typically consists essentially of an amplifier with variable gain or sensitivity controlled by a multi-position switch 30 mounted on the front panel of the meter housing, and the display has a corresponding set of measurement scales. A Model 3 Survey Meter from Ludlum Instruments is an example of such a GM meter and is suitable for use in the disclosed embodiment. According to one aspect of the present invention, such a GM meter is modified by adding a circuit which makes it capable of outputting instantaneous measurements in a digital RS-232 serial format. The circuit includes a small programmable flash microcontroller 32 and a digital signal level converter 34, both powered by the GM meter's onboard batteries. An Atmel ATtiny15L 8-bit microcontroller having RISC architecture and an internal A/D converter is suitable for the microcontroller, and a Maxim MAX3319 transceiver may be used as the level converter.

The above-referenced Model 3 Survey Meter has a multi-pole, multi-position front panel switch 30 with a first set of contacts connected to the meter circuit for selecting a desired sensitivity, and an electrically isolated second set of contacts which are used in modified meter 12 as connection points between adjacent resistors in a voltage divider. The voltage divider is supplied with power from the meter's onboard batteries. The common terminal for the second set of switch contacts is used as a voltage divider output and is connected to the microcontroller, which is suitably programmed to determine the switch position and thus the meter sensitivity setting from the voltage divider's DC output voltage. A DC level proportional to the battery voltage is supplied to the microcontroller from a fixed point in the voltage divider for purposes of monitoring the instantaneous charge of the onboard batteries.

The microcontroller is responsible for collecting, converting, and routing data including GM meter readings, switch position and battery charge. RS-232 transceiver chip 34 translates the microcontroller's input/output voltages into levels compatible with a standard PC serial port. In one embodiment, the computer sends a data request every second to the microcontroller, which is programmed to respond by taking a current reading and sending the data value to the computer via the serial port.

Figure 3:
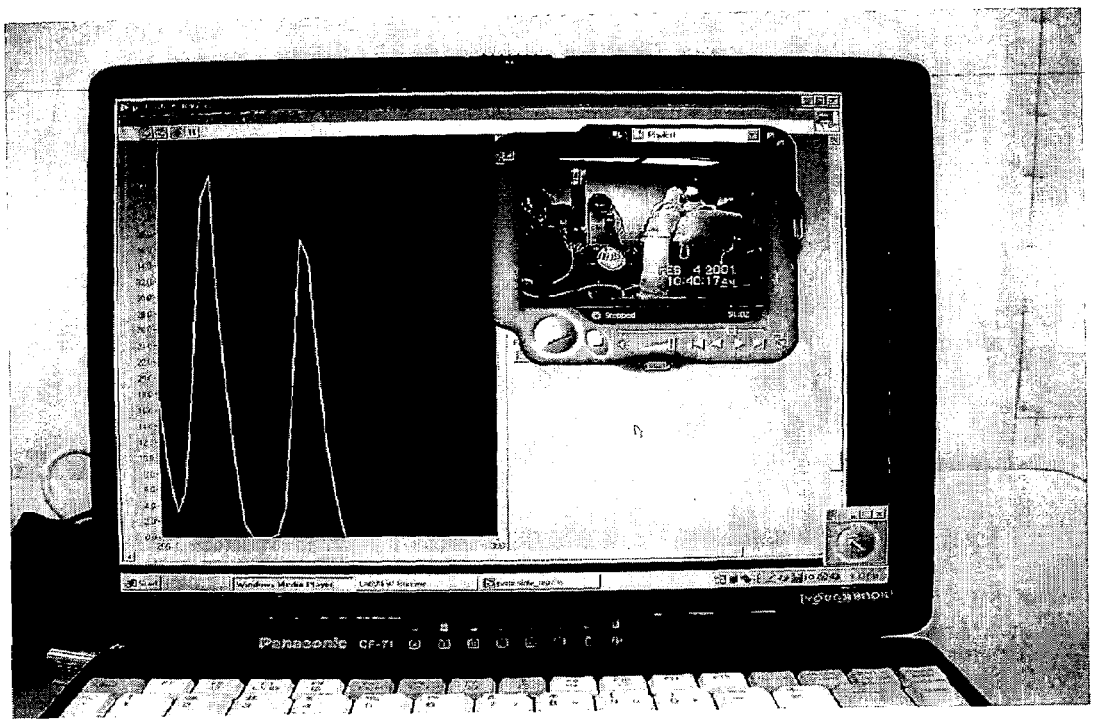
FIG. 3 is an example of a simultaneous display of radiation exposure data and video data according to one embodiment of the present invention.
Figure 4:
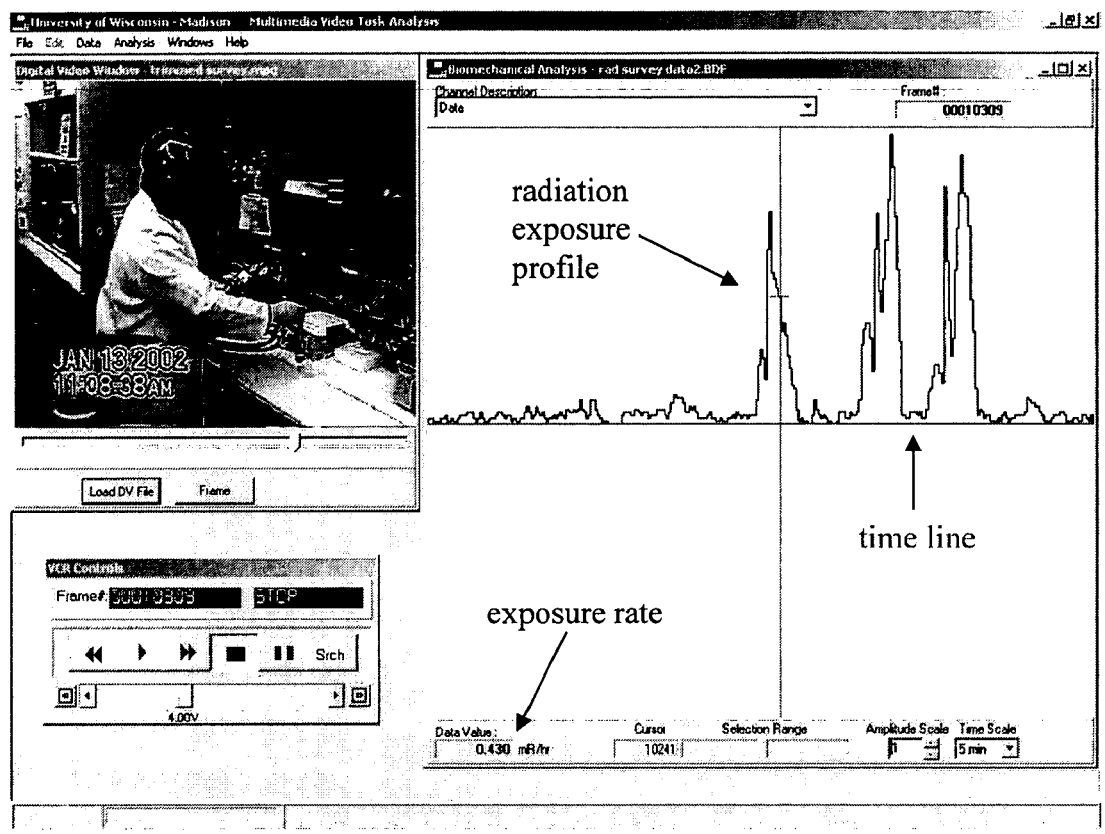
FIG. 4 is an example of a simultaneous display of radiation exposure data and video data according to another embodiment of the present invention.

This modified GM survey meter sends data to computer 18 through modems 14 and 16, which may be Satel Satellite 3ASd radio modems. The computer in the disclosed embodiment is programmed to simultaneously display such data along with the corresponding video on the computer screen using Labview software, commercially available from National Instruments. The computer is also provided with Multimedia Video Task Analysis (MVTA) software, developed by engineers at the University of Wisconsin, Madison, and commercially available from NexGen Ergonomics Inc. The MVTA system is a time-based software system that allows easy categorization of work elements. The MVTA results are synchronized with real-time personal exposure data to identify specific exposure conditions. The signal from the GM meter may be overlaid, in a graphical format, with the video of an employee working. The radiation exposure profile may thus be superimposed on the video and thereby help identify which work element had contributed to the worker's exposure. In one embodiment of the present invention, Labview is used to acquire exposure data and store the data in a data file, while the corresponding video is captured and stored in a video file using the Dazzle video converter. The exposure data and video data being collected may be displayed simultaneously, with the Labview display in a window on the left side of the computer screen and the video data in a window on the right side of the computer screen, as shown in FIG. 3. MVTA may subsequently be opened and used to provide a similar display from data imported from the data file and video file which were used to store data during data acquisition. An example of an MVTA display is shown in FIG. 4, with video in the upper left and radiation exposure data displayed against time on the right. The video record may be reviewed at any speed and in any sequence (real-time, slow motion, fast motion, or frame-by-frame in either forward or reverse direction). Analysts can replay any event as much as desired in a continuous loop or direct the video to display an arbitary event or point in time in stop-action. MVTA produces time study reports, and it computes the frequency of occurrence for each event. Both Labview and the MVTA system can provide real-time radiological and videography output data. However, the MVTA system has a statistical analysis program built into its software package. LabView can provide the radiological data which can be later analyzed using Excel or similar software.

In operation, a radiation safety professional may hold the modified GM meter and use it to locate radioactive contaminants during a survey of a laboratory or other facility. The unit measures the exposure levels as the video camera tapes a worker's job tasks for an entire work period. While the task is being performed, the data from the survey meter are automatically sent to the computer where they are combined in real time with the video, thus allowing a true real-time exposure assessment strategy. This method will assist the health physicist in interacting with the worker, allowing them to make recommendations for improving the worker's job performance. This will enhance the ability of the health physicist to see the effect that altered work practices have on the employee's exposure levels. The simultaneous overlay will also permit the data to be analyzed on site.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

We claim:

1. A real-time video radiation exposure monitoring system, comprising:

a Geiger-Müeller tube;

an A/D converter having an input connected to said Geiger-Müeller tube;
a computer;
wireless transmitting means connected to said A/D converter for transmitting digital data to said computer; and
a video camera linked to said computer,
wherein said computer is programmed to display video images from said camera simultaneously with data from said Geiger-Müeller tube,
further comprising a variable-sensitivity meter circuit connected between said Geiger-Müeller tube and said A/D converter, and means for encoding the sensitivity setting of said meter circuit and supplying the encoded sensitivity setting to said wireless transmitting means.

2. A real-time video radiation exposure monitoring system, comprising:
a Geiger-Müeller tube;
an A/D converter having an input connected to said Geiger-Müeller tube;
a computer;
wireless transmitting means connected to said A/D converter for transmitting digital data to said computer; and
a video camera linked to said computer,
wherein said computer is programmed to display video images from said camera simultaneously with data from said Geiger-Müeller tube,
further comprising a RISC microcontroller connected between said Geiger-Müeller tube and said wireless transmitting means, wherein said A/D converter is contained in said RISC microcontroller.

3. A method of assessing radiation exposure, comprising:
measuring radiation in an area of a workplace with a Geiger-Müeller meter having an analog electronic circuit, wherein said Geiger-Müeller meter is adapted for digital output with an A/D converter having an input connected to an output of said analog electronic circuit;
converting radiation readings from said Geiger-Müeller meter to digital data using said A/D converter;
obtaining video images of said area as said measuring step is performed;
supplying radiation data from said Geiger-Müeller meter to a computer by transmitting said digital data to said computer over a wireless link;
supplying said video images to said computer;
processing said radiation data and video images in said computer; and
displaying said radiation data and video images simultaneously on a display screen,
further comprising the step of detecting the sensitivity level of said Geiger-Müeller meter and supplying said sensitivity level to said computer over said wireless link.

4. The method of claim 3, further comprising the step of adapting said Geiger-Müeller meter for digital output by connecting a RISC microcontroller with an internal A/D converter to an output of said analog electronic circuit.

* * * * *